United States Patent
Eoh et al.

(10) Patent No.: US 11,614,747 B2
(45) Date of Patent: Mar. 28, 2023

(54) ROBOT GENERATING MAP AND CONFIGURING CORRELATION OF NODES BASED ON MULTI SENSORS AND ARTIFICIAL INTELLIGENCE, AND MOVING BASED ON MAP, AND METHOD OF GENERATING MAP

(71) Applicant: LG ELECTRONICS INC., Seoul (KR)

(72) Inventors: Gyuho Eoh, Seoul (KR); Jungsik Kim, Seoul (KR); Hyoungrock Kim, Seoul (KR); Dong Ki Noh, Seoul (KR); Joongtae Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 233 days.

(21) Appl. No.: 16/760,013

(22) PCT Filed: May 16, 2019

(86) PCT No.: PCT/KR2019/005885
§ 371 (c)(1),
(2) Date: Apr. 28, 2020

(87) PCT Pub. No.: WO2020/230931
PCT Pub. Date: Nov. 19, 2020

(65) Prior Publication Data
US 2021/0405650 A1    Dec. 30, 2021

(51) Int. Cl.
*G05D 1/02* (2020.01)
*G01S 17/931* (2020.01)
*G01S 17/86* (2020.01)

(52) U.S. Cl.
CPC ............ *G05D 1/0274* (2013.01); *G01S 17/86* (2020.01); *G01S 17/931* (2020.01); *G05D 1/0253* (2013.01); *G05D 1/0272* (2013.01)

(58) Field of Classification Search
None
See application file for complete search history.

(56) References Cited

U.S. PATENT DOCUMENTS

| 2016/0209846 A1 | 7/2016 | Eustice et al. |
| 2018/0204338 A1 | 7/2018 | Narang et al. |

(Continued)

FOREIGN PATENT DOCUMENTS

| KR | 20180044486 | 5/2018 |
| KR | 20180117879 | 10/2018 |
| KR | 20180118500 | 10/2018 |

OTHER PUBLICATIONS

PCT International Application No. PCT/KR2019/005885, International Search Report dated Feb. 14, 2020, 3 pages.

*Primary Examiner* — Hunter B Lonsberry
*Assistant Examiner* — Paysun Wu
(74) *Attorney, Agent, or Firm* — Lee, Hong, Degerman, Kang & Waimey PC

(57) ABSTRACT

Disclosed herein are a robot that generates a map and configures a correlation of nodes, based on multi sensors and artificial intelligence, and that moves based on the map, and a method of generating a map, and the robot according to an embodiment generates a pose graph comprised of LiDAR branch, visual branch, and backbone, and the LiDAR branch includes one or more of the LiDAR frames, the visual branch includes one or more of the visual frames, and the backbone includes two or more frame nodes registered with any one or more of the LiDAR frames or the visual frames, and to generate a correlation between nodes in the pose graph.

20 Claims, 12 Drawing Sheets

(56) References Cited

U.S. PATENT DOCUMENTS

| | | |
|---|---|---|
| 2018/0307232 A1 | 10/2018 | Myeong |
| 2020/0116827 A1* | 4/2020 | Agarwal |
| 2020/0209009 A1* | 7/2020 | Zhang ................. G06F 3/04815 |
| 2020/0217666 A1* | 7/2020 | Zhang ................... H04W 4/029 |
| 2021/0274358 A1* | 9/2021 | Shankar ................ H04W 88/08 |
| 2021/0354302 A1* | 11/2021 | Bathala |
| 2022/0024486 A1* | 1/2022 | Scott .................... G05D 1/0221 |

\* cited by examiner

⊘ SEARCHING AREA
⊗ REFERENCE NODE
⊙ FRAME NODE IN WHICH LiDAR KEYFRAME IS ONLY REGISTERED
⊙ FRAME NODE IN WHICH VISUAL KEYFRAME IS ONLY REGISTERED
⊙ FRAME NODE IN WHICH LiDAR KEYFRAME AND
  VISUAL KEYFRAME ARE ALL REGISTERED
--- STRONG CORRELATION VISUAL EDGE
······ WEAK CORRELATION VISUAL EDGE

- SEARCHING AREA
- REFERENCE NODE
- FRAME NODE IN WHICH LiDAR KEYFRAME IS ONLY REGISTERED
- FRAME NODE IN WHICH VISUAL KEYFRAME IS ONLY REGISTERED
- FRAME NODE IN WHICH LiDAR KEYFRAME AND VISUAL KEYFRAME ARE ALL REGISTERED
- --- STRONG CORRELATION VISUAL EDGE
- ······ WEAK CORRELATION VISUAL EDGE

◎ SEARCHING AREA
⊗ REFERENCE NODE
⊙ FRAME NODE IN WHICH LiDAR KEYFRAME IS ONLY REGISTERED
◉ FRAME NODE IN WHICH VISUAL KEYFRAME IS ONLY REGISTERED
◐ FRAME NODE IN WHICH LiDAR KEYFRAME AND
   VISUAL KEYFRAME ARE ALL REGISTERED
--- STRONG CORRELATION VISUAL EDGE

ROBOT GENERATING MAP AND CONFIGURING CORRELATION OF NODES BASED ON MULTI SENSORS AND ARTIFICIAL INTELLIGENCE, AND MOVING BASED ON MAP, AND METHOD OF GENERATING MAP

CROSS-REFERENCE TO RELATED APPLICATIONS

This application is the National Stage filing under 35 U.S.C. 371 of International Application No. PCT/KR2019/005885, filed on May 16, 2019, the contents of which are all hereby incorporated by reference herein in their entirety.

TECHNICAL FIELD

The present disclosure relates to a robot that generates a map and configures a correlation of nodes, based on multi sensors and artificial intelligence, and that moves based on the map, and a method of generating a map.

BACKGROUND

A large-scale retail store, a department store, an airport, a golf course, and the like are places where exchange of goods and services takes place between people. Robots may be useful in the places to offer information or convenience to people.

Robots may be classified as guide robots, security robots, cleaning robots and the like. The robots move in a space, confirming their positions.

The robots are required for holding information on a space, on their current positions, on a path previously moved by the robots and the like such that the robots move confirming their positions and avoiding obstacles.

The robots may store maps to confirm a space and to move in the space. To generate a map, the robots may draw up a map using a variety of sensors, and may match and store various pieces of information in the map.

However, errors may be produced due to features of each sensor and may be produced during the process in which a robot moves. Accordingly, technologies for generating and correcting maps are required considering the errors.

DISCLOSURE

Technical Problems

As a means to solve the above-described problems, the present disclosure is to allow a robot to generate a map for a space using various sensors, and to store information based on the sensors in the map.

Additionally, the present disclosure is to implement fusion SLAM in which the position of a robot is identified using various sensors in a space.

Further, the present disclosure is to allow a robot to set a correlation between nodes in a map and to enhance accuracy of fusion SLAM.

Objectives of the present disclosure are not limited to what has been described. Additionally, other objectives and advantages that have not been mentioned may be clearly understood from the following description and may be more clearly understood from embodiments. Further, it will be understood that the objectives and advantages of the present disclosure may be realized via means and a combination thereof that are described in the appended claims.

Technical Solutions

A robot generating a map on the basis of multiple sensors and artificial intelligence and configuring a correlation of nodes according to an embodiment includes a LiDAR sensor sensing a distance between an object outside the robot and the robot and generating a LiDAR frame, and a camera sensor photographing an object outside the robot and generating a visual frame.

A robot generating a map on the basis of multiple sensors and artificial intelligence and configuring a correlation of nodes according to an embodiment includes a controller that generates a pose graph comprised of LiDAR branch, visual branch, and backbone, and the LiDAR branch includes one or more of the LiDAR frames, and the visual branch includes one or more of the visual frames, and the backbone includes two or more frame nodes registered with any one or more of the LiDAR frames or the visual frames, and the controller generates a correlation between nodes in the pose graph.

A robot generating a map on the basis of multiple sensors and artificial intelligence and configuring a correlation of nodes according to an embodiment includes a map storage that stores the LiDAR branch, the visual branch, the backbone and the correlation.

A robot generating a map on the basis of multiple sensors and artificial intelligence and configuring a correlation of nodes according to an embodiment selects two adjacent nodes among nodes, sets wheel odometry information, which is generated by a wheel encoder when the robot moves between the two nodes, as a correlation between the two nodes, and stores the correlation in the map storage.

A robot generating a map on the basis of multiple sensors and artificial intelligence and configuring a correlation of nodes according to an embodiment generates LiDAR odometry information using two LiDAR frames registered between two nodes, or generates visual odometry information using two visual frames registered between two nodes.

A robot generating a map on the basis of multiple sensors and artificial intelligence and configuring a correlation of nodes according to an embodiment selects nodes, which are not adjacent and in which a visual frame is registered, among nodes, generates an essential graph, and generates a correlation between nodes in which a LiDAR frame is registered, in the generated essential graph.

A robot that moves using a map in which a correlation of nodes is stored on the basis of multiple sensors and artificial intelligence according to an embodiment includes a wheel encoder generating wheel odometry information while the robot is moving, a LiDAR sensor sensing a distance between an object outside the robot and the robot and generating a first LiDAR frame, and a camera sensor photographing an object outside the robot and generating a first visual frame, and a controller calculating the current position of the robot by comparing the wheel odometry information and the first LiDAR frame and the first visual frame and the correlation of nodes stored in the map storage.

Advantageous Effects

The present disclosure according to embodiments allows a robot to generate a map for a space using various sensors and to configure a correlation between each of the nodes in the map.

The present disclosure according to embodiments allows a robot to perform fusion SLAM in a space using various sensors.

The present disclosure according to embodiments allows a robot to use a correlation while the robot moves on the basis of a map comprised of various sensors and to accurately calculate the current position of the robot.

Effects of the present disclosure are not limited to the above-described ones, and one having ordinary skill in the art to which the disclosure pertains may easily draw various effects from the configuration of the disclosure.

DETAILED DESCRIPTION

Figure 1:
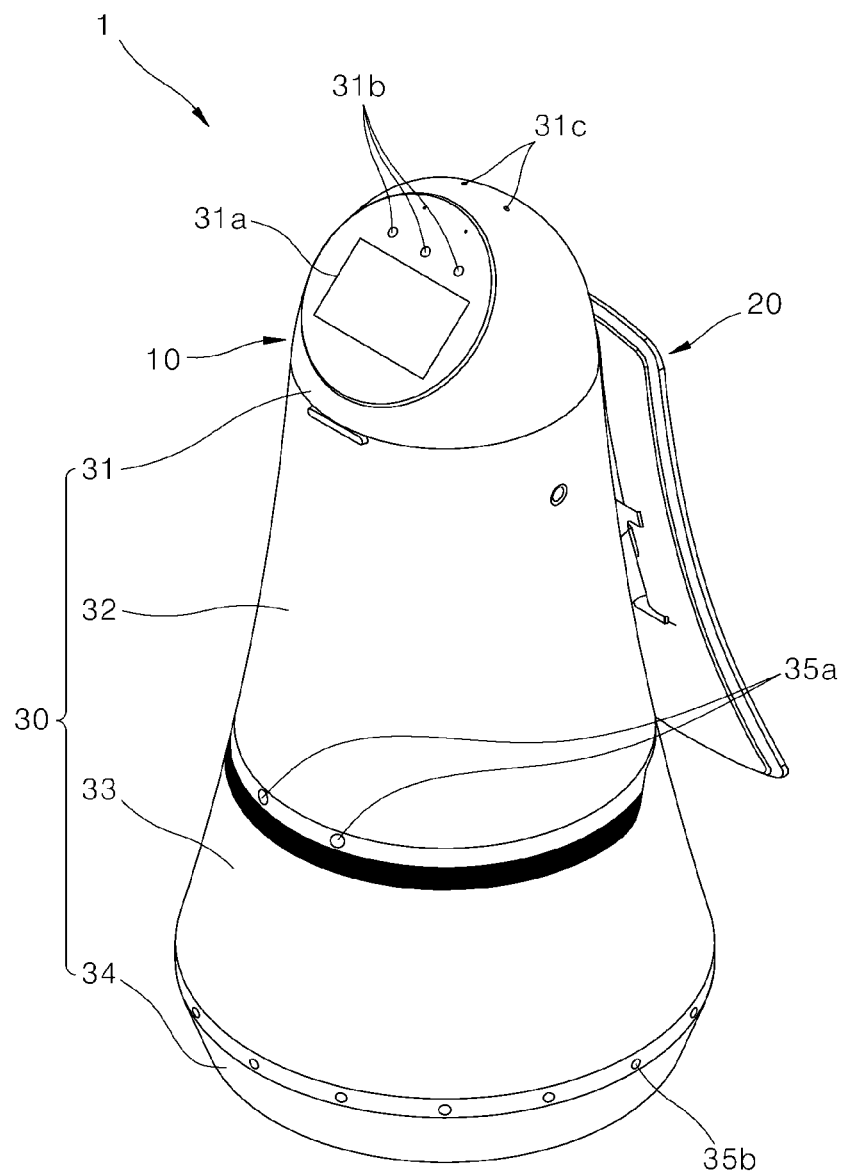
FIG. 1 shows an appearance of a robot according to an embodiment.

Hereinafter, embodiments of the present disclosure will be described in detail with reference to the drawings so that those skilled in the art to which the present disclosure pertains can easily implement the present disclosure. The present disclosure may be implemented in many different manners and is not limited to the embodiments described herein.

In order to clearly illustrate the present disclosure, technical explanation that is not directly related to the present disclosure may be omitted, and same or similar components are denoted by a same reference numeral throughout the specification. Further, some embodiments of the present disclosure will be described in detail with reference to the drawings. In adding reference numerals to components of each drawing, the same components may have the same reference numeral as possible even if they are displayed on different drawings. Further, in describing the present disclosure, a detailed description of related known configurations and functions will be omitted when it is determined that it may obscure the gist of the present disclosure.

In describing components of the present disclosure, it is possible to use the terms such as first, second, A, B, (a), and (b), etc. These terms are only intended to distinguish a component from another component, and a nature, an order, a sequence, or the number of the corresponding components is not limited by that term. When a component is described as being "connected," "coupled" or "connected" to another component, the component may be directly connected or able to be connected to the other component; however, it is also to be understood that an additional component may be "interposed" between the two components, or the two components may be "connected," "coupled" or "connected" through an additional component.

Further, with respect to embodiments of the present disclosure, for convenience of explanation, the present disclosure may be described by subdividing an individual component, but the components of the present disclosure may be implemented within a device or a module, or a component of the present disclosure may be implemented by being divided into a plurality of devices or modules.

In this specification, a robot includes devices that are used for specific purposes (cleaning, ensuring security, monitoring, guiding and the like) or that moves offering functions according to features of a space in which the robot is moving, hereunder. Accordingly, in this specification, devices that have transportation means capable of moving using predetermined information and sensors, and that offer predetermined functions are generally referred to as a robot.

In this specification, a robot may move with storing a map. The map denotes information on fixed objects such as fixed walls, fixed stairs and the like that do not move in a space. Additionally, information on movable obstacles that are disposed periodically, i.e., information on dynamic objects may be stored on the map.

As an example, information on obstacles disposed within a certain range with respect to a direction in which the robot moves forward may also be stored in the map. In this case, unlike the map in which the above-described fixed objects are stored, the map includes information on obstacles, which is registered temporarily, and then removes the information after the robot moves.

Further, in this specification, the robot may confirm an external dynamic object using various sensors. When the robot moves to a destination in an environment that is crowded with a large number of pedestrians after confirming the external dynamic object, the robot may confirm a state in which waypoints to the destination are occupied by obstacles.

Furthermore, the robot may determine the robot arrives at a waypoint on the basis of a degree in a change of directions of the waypoint, and the robot moves to the destination for next waypoint successfully.

FIG. 1 shows an appearance of a robot according to an embodiment. FIG. 1 shows an exemplary appearance. The robot may be implemented as robots having various appearances in addition to the appearance of FIG. 1. Specifically, each component may be disposed in different positions in the upward, downward, leftward and rightward directions on the basis of the shape of a robot.

A main body 10 may be configured to be long in the up-down direction, and may have the shape of a roly poly toy that gradually becomes slimmer from the lower portion toward the upper portion, as a whole.

The main body 10 may include a case 30 that forms the appearance of the robot 1. The case 30 may include a top cover 31 disposed on the upper side, a first middle cover 32 disposed on the lower side of the top cover 31, a second middle cover 33 disposed on the lower side of the first middle cover 32, and a bottom cover 34 disposed on the lower side of the second middle cover 33. The first middle cover 32 and the second middle cover 33 may constitute a single middle cover.

The top cover 31 may be disposed at the uppermost end of the robot 1, and may have the shape of a hemisphere or a dome. The top cover 31 may be disposed at a height below the average height for adults to readily receive an instruction from a user. Additionally, the top cover 31 may be configured to rotate at a predetermined angle.

The robot 1 may further include a control module 150 therein. The control module 150 controls the robot 1 like a type of computer or a type of processor. Accordingly, the control module 150 may be disposed in the robot 1, may perform functions similar to those of a main processor, and may interact with a user.

The control module 150 is disposed in the robot 1 to control the robot during robot's movement and by sensing objects around the robot. The control module 150 of the robot may be implemented as a software module, a chip in which a software module is implemented as hardware, and the like.

A display unit 31$a$ that receives an instruction from a user or that outputs information, and sensors, for example, a camera 31$b$ and a microphone 31$c$ may be disposed on one side of the front surface of the top cover 31.

In addition to the display unit 31$a$ of the top cover 31, a display unit 20 is also disposed on one side of the middle cover 32.

Information may be output by all the two display units 31$a$, 20 or may be output by any one of the two display units 31$a$, 20 according to functions of the robot.

Additionally, various obstacle sensors (220 in FIG. 2) are disposed on one lateral surface or in the entire lower end portion of the robot 1 like 35$a$, 35$b$. As an example, the obstacle sensors include a time-of-flight (TOF) sensor, an ultrasonic sensor, an infrared sensor, a depth sensor, a laser sensor, and a LiDAR sensor and the like. The sensors sense an obstacle outside of the robot 1 in various ways.

Additionally, the robot in FIG. 1 further includes a moving unit that is a component moving the robot in the lower end portion of the robot. The moving unit is a component that moves the robot, like wheels.

The shape of the robot in FIG. 1 is provided as an example. The present disclosure is not limited to the example. Additionally, various cameras and sensors of the robot may also be disposed in various portions of the robot 1. As an example, the robot of FIG. 1 may be a guide robot that gives information to a user and moves to a specific spot to guide a user.

The robot in FIG. 1 may also include a robot that offers cleaning services, security services or functions. The robot may perform a variety of functions. However, in this specification, the focus is on a guide robot for convenience of description.

In a state in which a plurality of the robots in FIG. 1 are disposed in a service space, the robots perform specific functions (guide services, cleaning services, security services and the like). In the process, the robot 1 may store information on its position, may confirm its current position in the entire space, and may generate a path required for moving to a destination.

Figure 2:
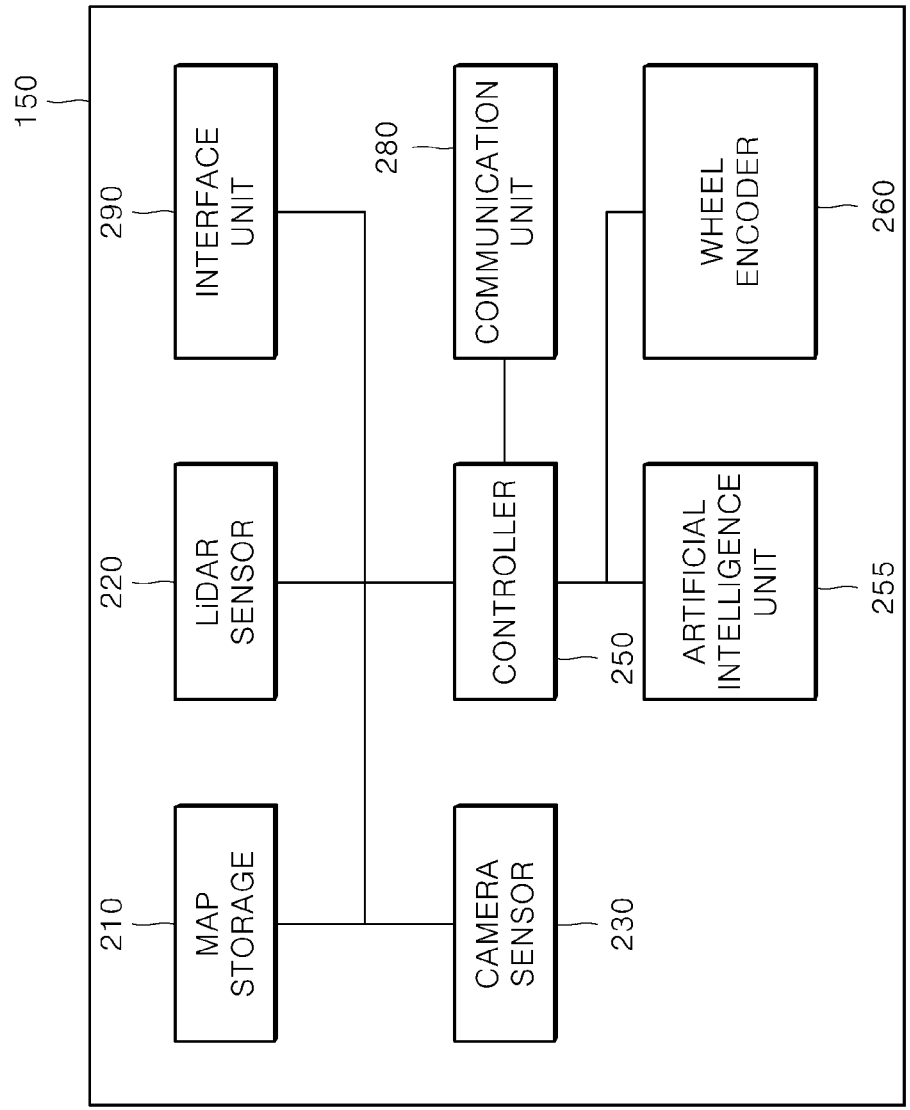
FIG. 2 shows components of a control module of a robot according to an embodiment.

FIG. 2 shows components of a control module of a robot according to an embodiment.

A LiDAR sensor 220 may sense surrounding objects two-dimensionally or three-dimensionally. A two-dimensional LiDAR sensor may sense positions of objects within 360-degree ranges with respect to the robot. LiDAR information sensed in a specific position may constitute a single LiDAR frame. That is, the LiDAR sensor 220 senses a distance between an object disposed outside the robot and the robot to generate a LiDAR frame.

As an example, a camera sensor 230 is a regular camera. To overcome viewing angle limitations, two or more camera sensors 230 may be used. An image captured in a specific position constitutes vision information. That is, the camera sensor 230 photographs an object outside the robot and generates a visual frame including vision information.

The robot 1, to which the present disclosure is applied, performs fusion-simultaneous localization and mapping (Fusion-SLAM) using the LiDAR sensor 220 and the camera sensor 230.

In fusion SLAM, LiDAR information and vision information may be combinedly used. The LiDAR information and vision information may be configured as maps.

Unlike a robot that uses a single sensor (LiDAR-only SLAM, visual-only SLAM), a robot that uses fusion-SLAM may enhance accuracy of estimating a position. That is, when fusion SLAM is performed by combining the LiDAR information and vision information, map quality may be enhanced.

The map quality is a criterion applied to both of the vision map comprised of pieces of vision information, and the LiDAR map comprised of pieces of LiDAR information. At the time of fusion SLAM, map quality of each of the vision map and LiDAR map is enhanced because sensors may share information that is not sufficiently acquired by each of the sensors.

Additionally, LiDAR information or vision information may be extracted from a single map and may be used. For example, LiDAR information or vision information, or all the LiDAR information and vision information may be used for localization of the robot in accordance with an amount of memory held by the robot or a calculation capability of a calculation processor, and the like.

An interface unit 290 receives information input by a user. The interface unit 290 receives various pieces of information such as a touch, a voice and the like input by the user, and outputs results of the input. Additionally, the interface unit 290 may output a map stored by the robot 1 or may output a course in which the robot moves by overlapping on the map.

Further, the interface unit 290 may supply predetermined information to a user.

A controller 250 generates a map as in FIG. 4 that is described below, and on the basis of the map, estimates a position of the robot in the process in which the robot moves.

A communication unit 280 may allow the robot 1 to communicate with another robot or an external server and to receive and transmit information.

The robot 1 may generate each map using each of the sensors (a LiDAR sensor and a camera sensor), or may generate a single map using each of the sensors and then may generate another map in which details corresponding to a specific sensor are only extracted from the single map.

Additionally, the map of the present disclosure may include odometry information on the basis of rotations of wheels. The odometry information is information on distances moved by the robot, which are calculated using frequencies of rotations of a wheel of the robot, a difference in frequencies of rotations of both wheels of the robot, and the like. A wheel encoder 260 in FIG. 2 generates wheel odometry information by collecting information on rotations, directions, and the like of wheels constituting the moving unit of the robot, and supplies the wheel odometry information to the controller 250. The controller 250 may calculate distances moved by the robot, directions in which the robot moves, and the like on the basis of the information supplied by the wheel encoder 260.

The robot may calculate a distance moved by the robot on the basis of the odometry information as well as the information generated using the sensors.

The controller 250 in FIG. 2 may further include an artificial intelligence unit 255 for artificial intelligence work and processing.

A plurality of LiDAR sensors 220 and camera sensors 230 may be disposed outside of the robot 1 to identify external objects.

In addition to the LiDAR sensor 220 and camera sensor 230 in FIG. 2, various types of sensors (a LiDAR sensor, an infrared sensor, an ultrasonic sensor, a depth sensor, an image sensor, a microphone, and the like) are disposed outside of the robot 1. The controller 250 collects and processes information sensed by the sensors.

The artificial intelligence unit 255 may input information that is processed by the LiDAR sensor 220, the camera sensor 230 and the other sensors, or information that is accumulated and stored while the robot 1 is moving, and the like, and may output results required for the controller 250 to determine an external situation, to process information and to generate a moving path.

As an example, the robot 1 may store information on positions of various objects, disposed in a space in which the robot is moving, as a map. The objects include a fixed object such as a wall, a door and the like, and a movable object such as a flower pot, a desk and the like. The artificial intelligence unit 255 may output data on a path taken by the robot, a range of work covered by the robot, and the like, using map information and information supplied by the LiDAR sensor 220, the camera sensor 230 and the other sensors.

Additionally, the artificial intelligence unit 255 may recognize objects disposed around the robot using information supplied by the LiDAR sensor 220, the camera sensor 230 and the other sensors. The artificial intelligence unit 255 may output meta information on an image by receiving the image. The meta information includes information on the name of an object in an image, a distance between an object and the robot, the sort of an object, whether an object is disposed on a map, and the like.

Information supplied by the LiDAR sensor 220, the camera sensor 230 and the other sensors is input to an input node of a deep learning network of the artificial intelligence unit 255, and then results are output from an output node of the artificial intelligence unit 255 through information processing of a hidden layer of the deep learning network of the artificial intelligence unit 255.

The controller 250 may calculate a moving path of the robot using date calculated by the artificial intelligence unit 255 or using data processed by various sensors.

Figure 3:
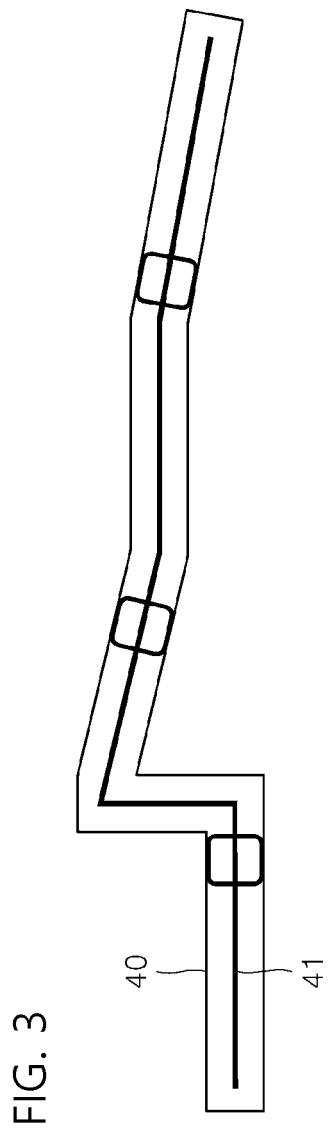
FIG. 3 shows a process in which a robot moves in a space.

FIG. 3 shows a process in which a robot moves in a space. The robot in the space 40 may move along a line indicated by reference No. 41, and may store information, sensed by the LiDAR sensor in a specific spot, in a map storage 210 using the LiDAR sensor 220. A basic shape of a space 40 may be stored as a local map.

Additionally, the robot may store information sensed by the camera sensor in a specific spot, in the map storage 210 using the camera sensor 230 while the robot is moving in the space 40.

Figure 4:
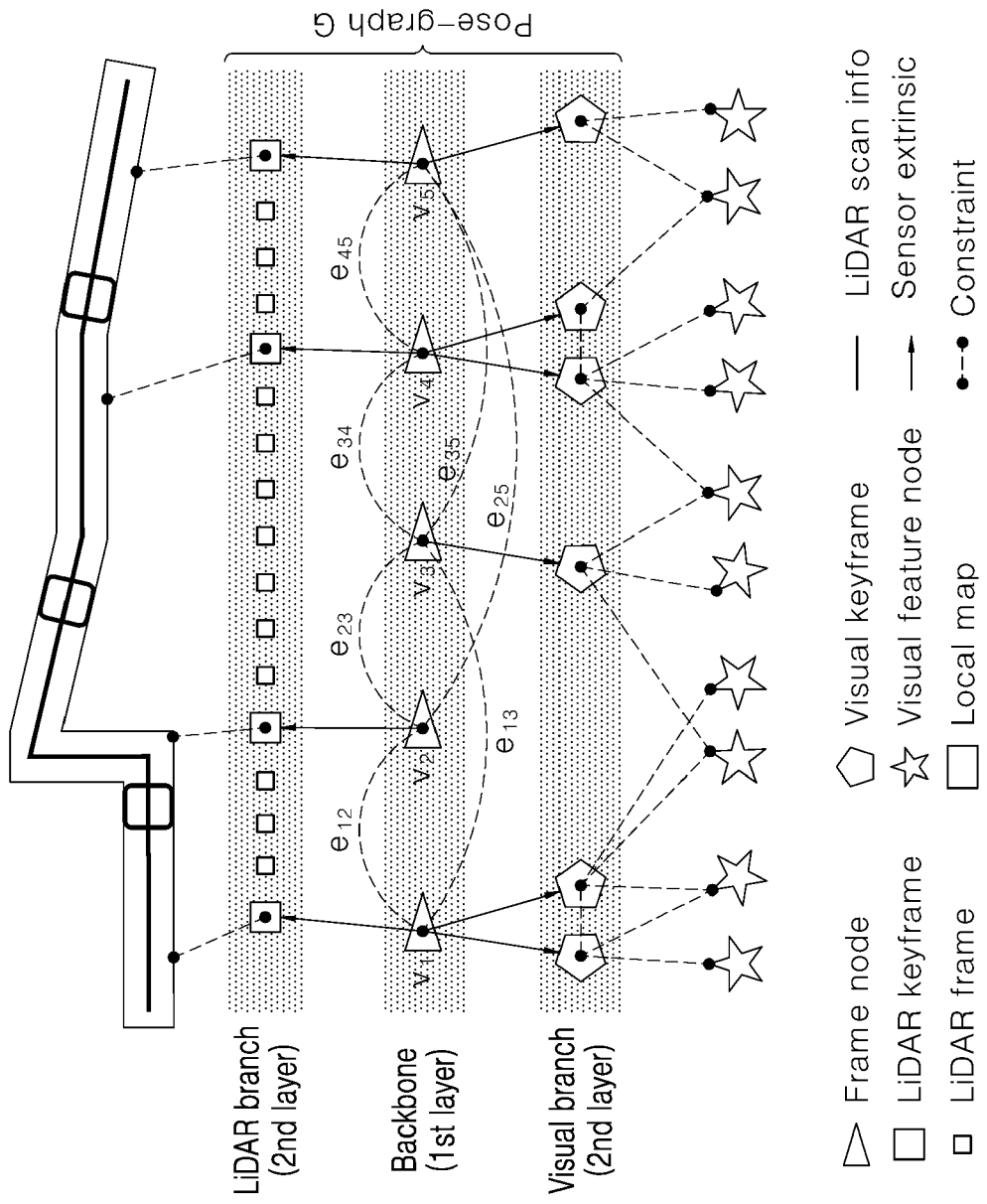
FIG. 4 shows a multiple structure of a map according to an embodiment.

FIG. 4 shows a multiple structure of a map according to an embodiment. FIG. 4 shows a double-layer structure in which a backbone is a first layer, and a LiDAR branch and a visual branch are respectively a second layer. The structure as in FIG. 4 is referred to as a structurally elastic pose graph-based SLAM.

The backbone is information on a trajectory of the robot. Additionally, the backbone includes one or more frame nodes corresponding to the trajectory. The frame nodes further include constraint information in a relation between the frame nodes and other frame nodes. An edge between nodes denotes constraint information. The edge denotes odometry constraint information (odometry constraint) or loop constraint information (loop constraint).

The LiDAR branch of the second layer is comprised of LiDAR frames. The LiDAR frames include a LiDAR sensing value that is sensed while the robot is moving. At least one or more of the LiDAR frames are set as a LiDAR keyframe.

The LiDAR keyframe has a corresponding relation with the nodes of the backbone. In FIG. 4, nodes v1, v2, v4, and v5 of the backbone indicate a LiDAR keyframe among nodes v1 to v5 of the backbone.

The visual branch of the second layer is comprised of visual keyframes. The visual keyframes indicate one or more visual feature nodes that are camera sensing values (i.e., an image captured by the camera) sensed while the robot is moving. The robot may generate a plurality of visual feature nodes on the basis of the number of camera sensors disposed in the robot.

In the map structure of FIG. 4, the LiDAR keyframe or the visual keyframe is connected to the frame node of the backbone. Certainly, the LiDAR/visual keyframe may all be connected to a single frame node (v1, v4, and v5).

Poses of the robot at the LiDAR or the visual keyframe are same, and the LiDAR or the visual keyframe is connected with each frame node. An extrinsic parameter may be added for each keyframe on the basis of a position of the robot, to which the LiDAR sensor or the camera sensor is attached. The extrinsic parameter denotes information on a relative position at which a sensor is attached from the center of the robot.

The visual keyframe has a corresponding relation with the node of the backbone. In FIG. 4, nodes v1, v3, v4, and v5 of the backbone indicate a visual keyframe among nodes v1 to v5 of the backbone. In FIG. 2, a pair of visual feature nodes (visual frames), comprised of two visual feature nodes, denote that the robot 1 captures an image using two camera sensors 230. There is an increase and a decrease in the number of visual feature nodes in each position on the basis of an increase and a decrease in the number of camera sensors 230.

Edges are displayed between nodes v1 to v5 constituting the backbone of the first layer. e12, e23, e34, and e45 are edges between adjacent nodes, and e13, e35, and e25 are edges between non-adjacent nodes.

Odometry constraint information, or for short, odometry information denotes constraints between adjacent frame nodes such as e12, e23, e34, and e45. Loop constraint information, or for short, loop information denotes constraints between non-adjacent frames such as e13, e25, and e35.

The backbone is comprised of a plurality of keyframes. The controller 250 may perform an initial mapping process to add the plurality of keyframes to the backbone. The initial mapping process includes adding the LiDAR keyframe and the visual frame based on the keyframe.

The structure of FIG. 4 is briefly described as follows. The LiDAR branch includes one or more LiDAR frames. The visual branch includes one or more visual frames.

Additionally, the backbone includes two or more frame nodes in which any one or more of a LiDAR frame or a visual frame are registered. In this case, the LiDAR frame or the visual frame registered in the frame node is referred to as a keyframe. A pose graph includes the LiDAR branch, the visual branch and the backbone.

Further, the pose graph includes odometry information, loop information and the like among frame nodes. The odometry information includes information on rotations, directions, and the like of wheels, which is generated while the robot is moving between frames nodes. The loop information is based on a set of frame nodes connected using specific constraints between visual keyframes around a specific frame node within a maximum sensing distance of the LiDAR sensor 220.

The controller 250 generates the pose graph in FIG. 4. The controller 250 stores the LiDAR branch, the visual branch, the backbone, the odometry information between frame nodes, and the pose graph including the premises in the map storage 210.

Below, frame nodes are referred to as nodes for short. Additionally, the LiDAR information or the visual information registered in the frame node are respectively indicated as a LiDAR keyframe and a visual keyframe. Further, the LiDAR information may all be registered in the frame node. Accordingly, the LiDAR information referred based on the frame node is indicated as a LiDAR keyframe, a LiDAR frame, LiDAR information and the like. The visual information registered in the frame node is also indicated as a visual keyframe, a visual frame, visual information and the like.

As illustrated in FIG. 4, e12, e23, e34, and e45 are edges between adjacent nodes, and e13, e35, and e25 are edges between non-adjacent nodes. A correlation, that is constraint, is set between the nodes. The correlation denotes information that can be used by the robot 1 in order for the robot to perform fusion SLAM when the robot moves between nodes.

Additionally, the correlation denotes conditions that have to be satisfied by the robot 1 when the robot moves between nodes, as a sort of constraint. For example, a LiDAR frame confirmed in a first node, and a LiDAR frame confirmed in a second node may be constraints that are required for confirming a position when the robot moves between the first node and the second node.

The correlation between adjacent nodes includes information required for confirming the current position of the robot when the robot moves between two adjacent nodes. The two adjacent nodes denote that another node is not disposed on a path that connects between two nodes. A correlation between non-adjacent nodes includes information required for confirming the current position of the robot when the robot moves between two non-adjacent nodes. The non-adjacent node denotes that another node is disposed on a path between two nodes or near the path.

As an example, the adjacent node indicates two nodes in which wheel odometry information is registered, and the non-adjacent node indicates two nodes in which wheel odometry information is not registered. As another example, the non-adjacent node denotes two nodes that include two or more pieces of wheel odometry information because a waypoint node is disposed between the two nodes. For example, in FIG. 4, e13 that is an edge between non-adjacent nodes may combine wheel odometry information on e12 and e23, and may store the combined odometry information as a correlation.

Accordingly, the controller 250 of the robot may select a correlation between nodes on the basis of information generated by different types of sensors, and may store the correlation in a map such that the robot moves on the basis of fusion SLAM.

For example, when selecting a correlation between adjacent nodes in fusion SLAM and storing the correlation in a map, the robot may exactly confirm the current position of the robot while moving between the adjacent nodes. When selecting a correlation between non-adjacent nodes in fusion SLAM and storing the correlation in a map, the robot may exactly confirm the current position of the robot while moving between the non-adjacent nodes.

The robot, as described above, performs fusion SLAM on the basis of two or more types of sensors. The robot may generate the map as in FIG. 4 on the basis of the LiDAR sensor 220 and the camera sensor 230. The LiDAR sensor 220 may sense objects in 360-degree directions, or two or more LiDAR sensors 220 may sense objects in a specific direction or at a specific height.

Additionally, one or two or more camera sensors 230 are also disposed in the robot 1 to overcome viewing angle limitations.

Below, a process in which the controller 250 generates a correlation between nodes of the pose graph in FIG. 4 is described. The correlation is generated in processes in which wheel odometry information between adjacent nodes and information of other sensors are combined (FIG. 5), and in which a visual frame-based essential graph between non-adjacent nodes is generated and then a loop correlation is generated on the basis of a LiDAR frame (FIGS. 6 to 10).

The generated correlation is stored in the map storage 210 along with the LiDAR branch, the visual branch and the backbone in FIG. 4. Then the robot 1 may perform fusion SLAM using the information stored in the map storage 210.

Figure 5:
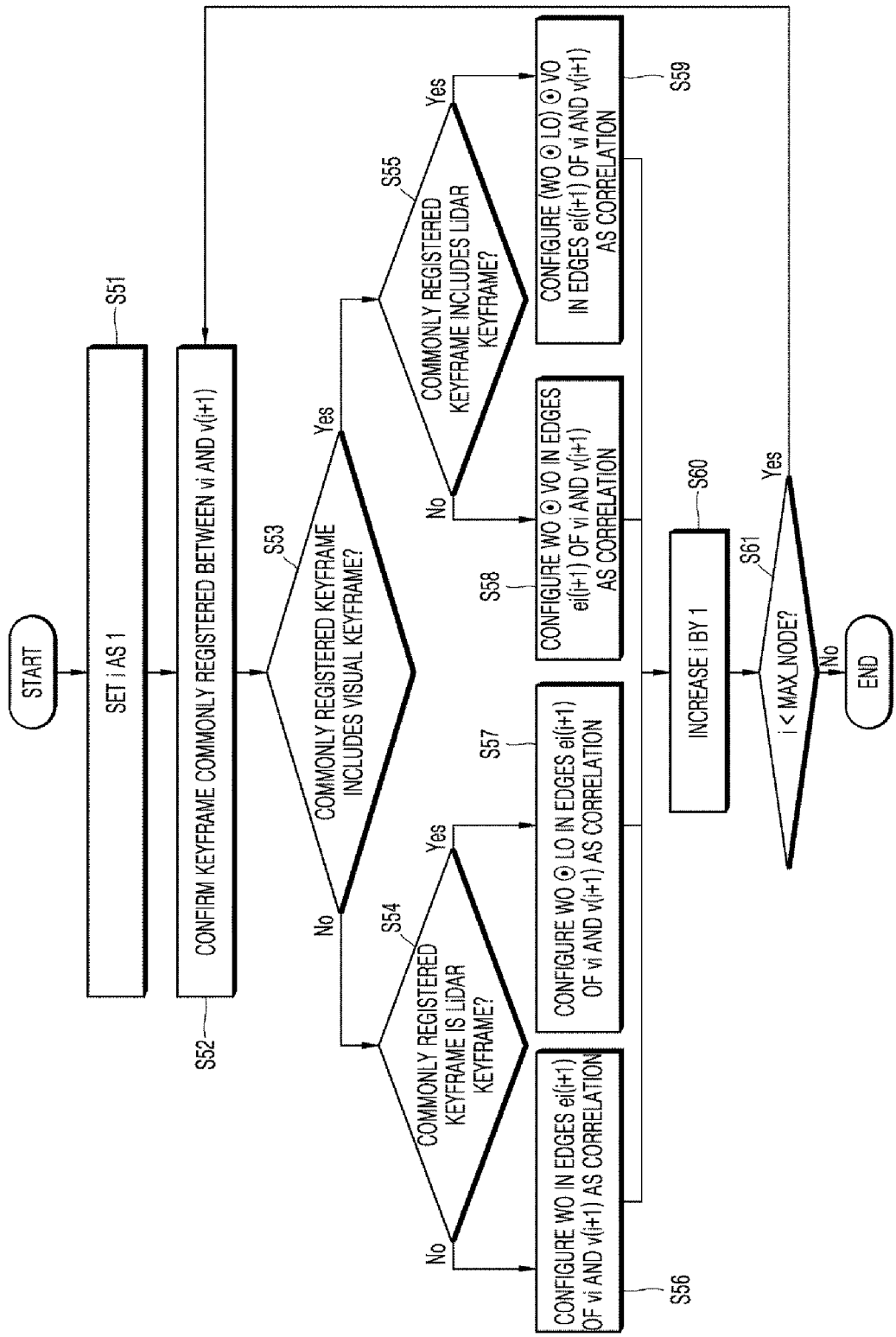
FIG. 5 shows a process of calculating a correlation between adjacent nodes according to an embodiment.

FIG. 5 shows a process of calculating a correlation between adjacent nodes according to an embodiment.

A correlation may be set between adjacent nodes by combining information acquired by each sensor. As an example, the controller 250 may calculate a correlation by combining the LiDAR sensor 220, the camera sensor 230 and rotations/directions of the wheels.

Odometry applicable between nodes includes wheel odometry (WO), visual odometry (VO), and LiDAR odometry (LO). The WO indicates odometry based on the wheel encoder 260.

The LO is LiDAR odometry information based on the LiDAR sensor 220. The VO is visual odometry information based on the camera sensor 230. The controller 250 may calculate a correlation between adjacent nodes on the basis of each of the LiDAR odometry information and the visual odometry information or a combination of the LiDAR odometry information and the visual odometry information.

The controller 250 sets i to 1 (S51), and starts a process of calculating a correlation. The controller 250 confirms a keyframe commonly registered between adjacent nodes vi and v(i+1) (S52). Being commonly registered denotes that the same sort of frames (a LiDAR frame or a visual frame) are respectively registered in both nodes.

That is, when a first LiDAR frame is registered in the first node, and a second LiDAR frame and a first visual frame are registered in the second node, the LiDAR frames are commonly registered in the first node and the second node. Odometry information between the first node and the second node is calculated on the basis of the first LiDAR frame and the second LiDAR frame.

The process is branched into step 54 or step 55 on the basis of whether a commonly registered keyframe includes a visual keyframe as a result of confirmation by the controller 250.

When a commonly registered keyframe does not include a visual keyframe, the controller 250 confirms whether the keyframe commonly registered in step 54 is a LiDAR keyframe (S54). When the keyframe commonly included in step 54 is not a LiDAR keyframe, there're is no common keyframe between the two nodes (vi and v(i+1)). Accordingly, WO is set on the basis of a correlation of edges ei(i+1)

of the nodes (vi and v(i+1)) (S56). This denotes that wheel odometry information that moves from between the two nodes by the wheels is set as a correlation.

When the keyframe commonly included in step 54 is a LiDAR keyframe, the LiDAR keyframes are the only common keyframe between the two nodes (vi and v(i+1)). Accordingly, WO⊙LO is set on the basis of a correlation between edges ei(i+1) of the nodes (vi and v(i+1)) (S57). This indicates that information, in which odometry information that moves from between the two nodes by the wheels and odometry information matched using a LiDAR keyframe are combined, is set as a correlation.

⊙ is a sort of operator. A⊙B denotes a combination of information A and information B. In this process, when there is a difference between information A and information B, any information having higher priority among information A and information B may be first applied.

As an example, LiDAR odometry information matched using a LiDAR keyframe is a difference between LiDAR keyframes of two nodes.

When a commonly registered keyframe includes a visual keyframe, the controller 250 confirms whether the commonly registered keyframe further includes a LiDAR keyframe in step 55 (S55). When the commonly included keyframe does not have a LiDAR keyframe in step 55, the visual keyframe is the only common keyframe between two nodes (vi and v(i+1)).

Accordingly, a correlation of edges ei(i+1) between the two nodes is set as WO⊙VO (S58). This indicates that information, in which odometry information that moves from between the two nodes by the wheels and odometry information matched using a visual keyframe are combined, is set as a correlation.

Visual odometry information matched using a visual keyframe is a difference between visual keyframes of two nodes.

When the commonly registered keyframe further includes a LiDAR keyframe in step 55, the LiDAR keyframe and the visual keyframe are registered as common keyframes between two nodes (vi and v(i+1)). Accordingly, a correlation of edges ei(i+1) between the two nodes is set as (WO⊙LO)⊙VO (S59).

This indicates that information, in which odometry information that moves from between the two nodes by the wheels, and odometry information matched using a LiDAR keyframe, and odometry information matched using a visual keyframe are all combined, is set as a correlation.

After the correlation of edges between the two adjacent nodes (vi and v(i+1)) is set, the controller 250 increases i by 1 (S60), and sets a correlation between the following adjacent nodes. If i is greater than or equal to a maximum number of nodes (MAX NODE, value of 5 in FIG. 4) (S61), setting a correlation of edges ends because setting correlations of edges with respect to all the nodes are finished.

The combination of correlations in step 56 to 59 is specifically described as follows.
  i) WO-Only: This is odometry information including rotations of a moving unit such as wheels, which are caused by movements of the robot. When the LiDAR sensor 220 or the camera sensor 230 is not available, the robot confirms a position using only WO.
  ii) WO⊙LO: This is odometry information that may use LO and WO. This is a combination in the case in which the LiDAR sensor 220 is available. In FIG. 4, a LiDAR keyframe was commonly registered in the nodes v1 and v2. Accordingly, e12 between v1 and v2 in FIG. 4, may use WO⊙LO.
  iii) WO⊙VO: This is odometry information that may use VO and WO. This is a combination in the case in which the camera sensor 230 is available. In FIG. 4, a visual keyframe is commonly registered in the nodes v3 and v4. Accordingly, e34 between v3 and v4 in FIG. 4, may use WO⊙VO.
  iv) (WO⊙LO)⊙VO: This is odometry information that may use all the WO, LO, and VO. This is a combination in the case in which the LiDAR sensor 220 and the camera sensor 230 are available. In FIG. 4, a LiDAR keyframe and a visual keyframe are commonly registered in the nodes v4 and v5. Accordingly, e45 between v4 and v5 in FIG. 4 may use (WO⊙LO)⊙VO.

When a speed of comparison of information sensed by the LiDAR sensor 220 is higher than a speed of comparison of information sensed by the camera sensor 230, the controller 250 may perform matching first on LO.

When a speed of comparison of information sensed by the LiDAR sensor 220 is lower than a speed of comparison of information sensed by the camera sensor 230, the controller 250 may perform matching first on VO. This is applied exemplarily when the LiDAR sensor 220 senses three-dimensionally. In this case, a combination may be (WO⊙VO)⊙LO.

In FIG. 5, odometry information between the nodes v1 to v5 of the backbone of each first layer may be combined in various ways according to the sort of keyframes registered in the nodes. Particularly, in a correlation between adjacent nodes, even when all the sensors are not available, or even when data of all the sensors are not registered as keyframes, the robot 1 may use wheel odometry information or odometry information based on another sensor.

The process in FIG. 5 is briefly described as follows. The controller 250 selects two adjacent nodes, sets wheel odometry information, generated by the moving unit (wheel encoder 260) when the moving unit moves between the two nodes, as a correlation between the two nodes and stores the correlation in the map storage (S56).

Additionally, the controller 250 generates LiDAR odometry information using two LiDAR frames registered between the two nodes (S57). The LiDAR odometry information may include a differential value of the two LiDAR frames (each LiDAR frame registered in each node) between the two nodes, or differential values changed according to a distance between the two nodes may be stored as LiDAR odometry information.

Further, the controller 250 generates visual odometry information using two visual frames registered between the two nodes (S58). The visual odometry information may include a differential value of the two visual frames (each visual frame registered in each node) between the two nodes, or differential values changed according to a distance between the two nodes may be stored as visual odometry information.

Figure 6:
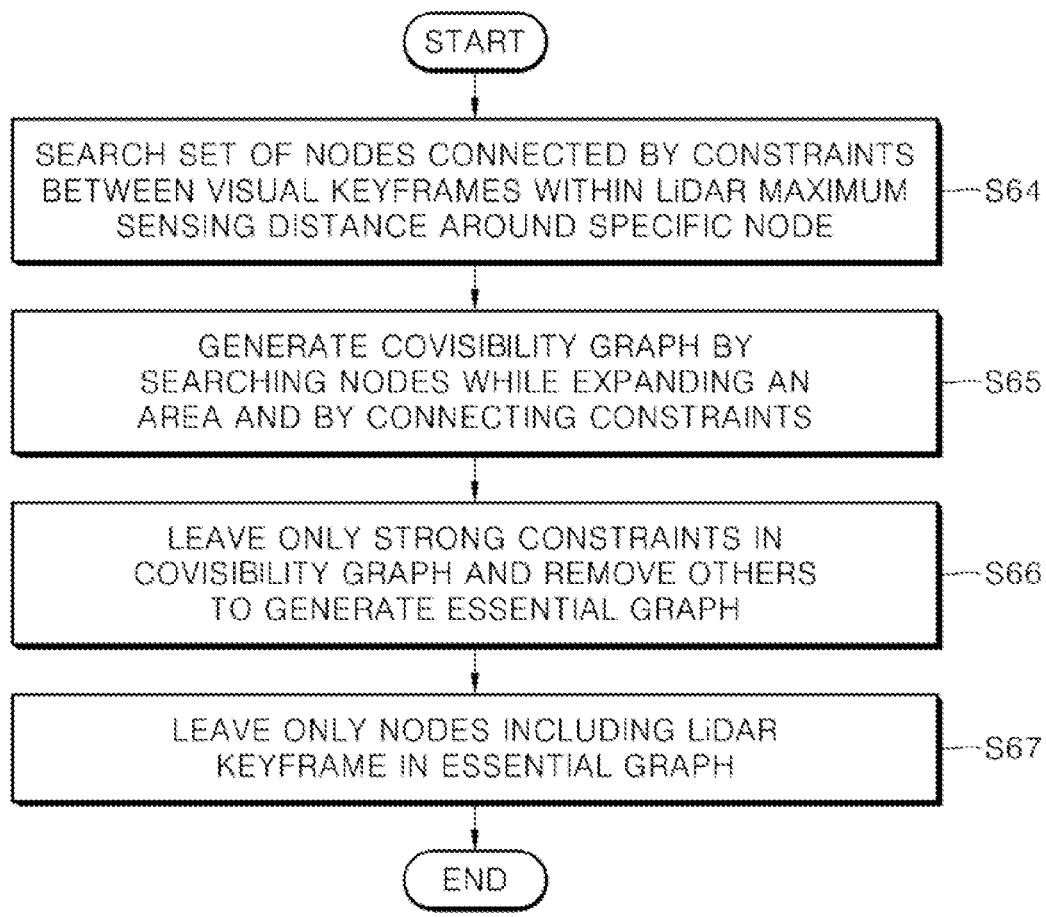
FIGS. 6 to 10 show a process of configuring a correlation between non-adjacent nodes according to an embodiment.

FIG. 6 shows a process of configuring a correlation between non-adjacent nodes according to an embodiment, and FIGS. 7 to 10 show results of calculation according to each step. A correlation of non-adjacent nodes may be applied to e13, e25, and e35 in FIG. 4. The controller 250 selects nodes which are not adjacent and in which visual frames are registered, among the nodes, generates an essential graph, and then generates a correlation between the nodes in which LiDAR frames are registered, in the generated essential graph.

In FIG. 6, the controller 250 searches a set of nodes that are connected in a specific correlation or a constraint relation between visual keyframes around a specific node (reference node) within a maximum sensing distance (R_max) that may be sensed by the LiDAR sensor (S64). In this case, the controller 250 may search all the weak correlations (weak constraints) or the strong correlations (strong constraints) on the basis of degrees of connections of constraints.

Figure 7:
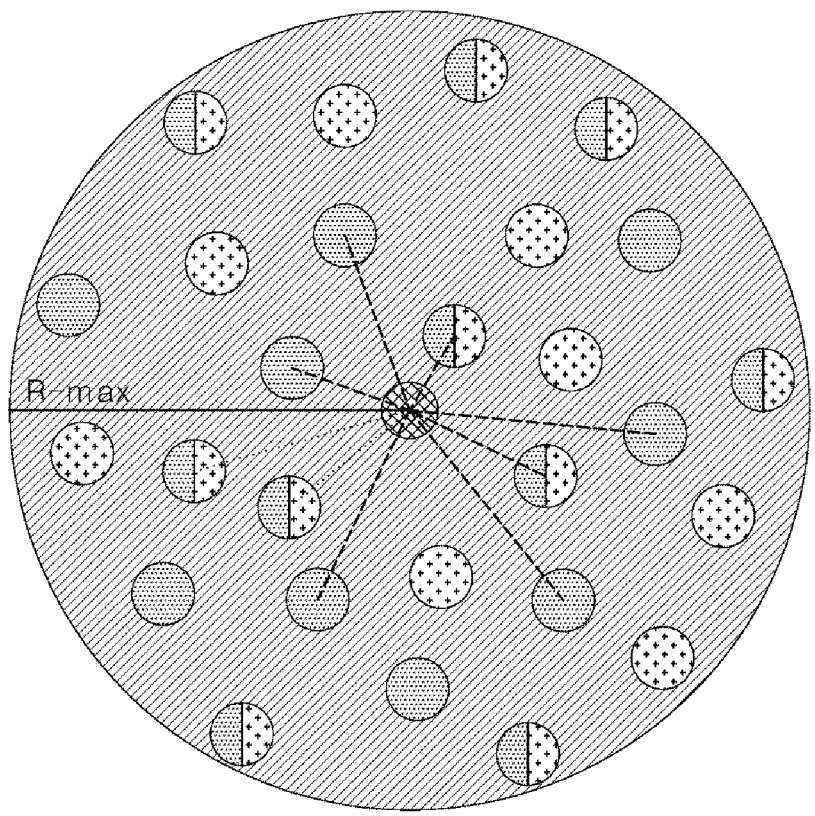

FIG. 7 shows step 64 in FIG. 6. The controller 250 sets a size of a searching region using a maximum sensing distance (R_max) that may be sensed by the LiDAR sensor as a radius around a specific reference node. Additionally, the controller 250 confirms whether there is a correlation between frame nodes including visual keyframes around the reference node.

Nodes that are connected to strong correlation visual edges (strong visual edges), and nodes that are connected to weak correlation visual edges (weak visual edges) are connected by dotted lines around the reference node in FIG. 7.

Next, the controller 250, as illustrated in FIG. 6, searches nodes and connects correlations (constraints) while continuously expanding the region according to the method of FIG. 7. The controller 250 generates a covisibility graph comprised of collections of correlations between visual keyframes by repeating step 64 (S65). Description in relation to this is provided with reference to FIG. 8.

Figure 8:
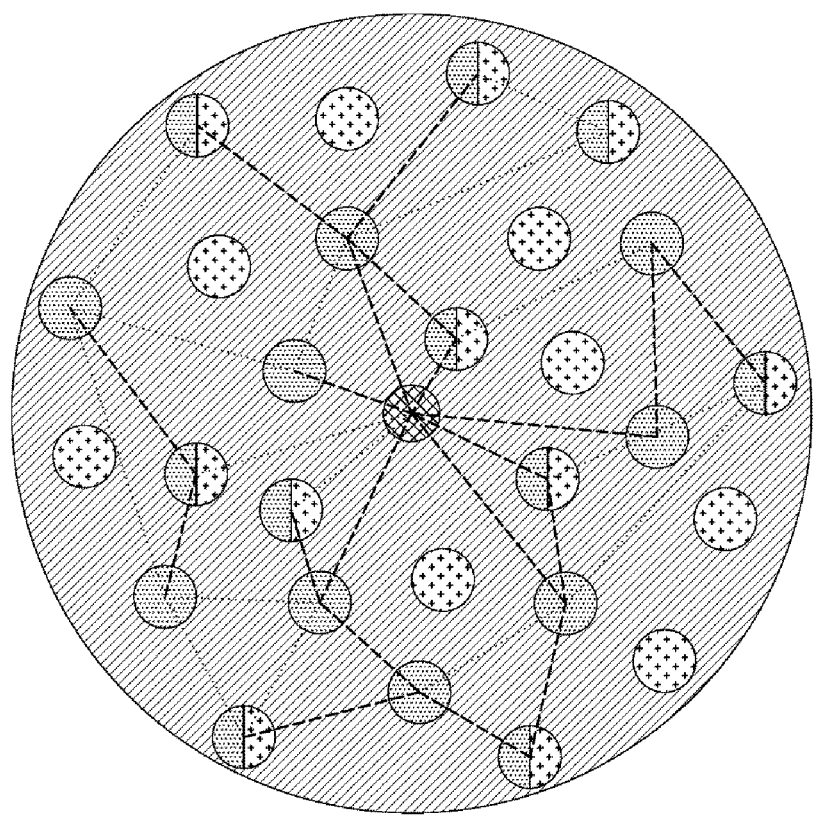

FIG. 8 shows step 65 in FIG. 6. Frame nodes including a visual keyframe are connected by visual edges. Frame nodes in which LiDAR keyframes are only registered are not connected to edges.

Specifically, the controller 250 as in FIG. 7 generates visual edges depending on whether there is a correlation around a reference node at first, confirms whether there is also an edge between other nodes, and then generates results as in FIG. 8.

Next, the controller 250 as in FIG. 6 leaves only strong correlation edges in the covisibility graph, removes the other edges and nodes and then generates an essential graph (S66). The essential graph includes nodes that may be compared to confirm positions of the robot at the time of fusion SLAM because of a high similarity as a result of comparison between a first visual frame and a second visual frame respectively registered in two nodes, and edges of the nodes.

For example, suppose that a first node and a second node constitute an essential graph and have a strong correlation, and that a third node does not constitute an essential graph.

A first visual frame was registered in the first node, a second visual frame was registered in the second node, and a third visual frame was registered in the third node.

The controller 250 configures nodes, in which visual frames having a high similarity are registered, as an essential graph. Thus, a similarity between the first visual frame and the second visual frame is higher than a similarity between the third visual frame and the first visual frame, or a similarity between the first visual frame and the second visual frame is higher than a similarity between the third visual frame and the second visual frame.

Figure 9:
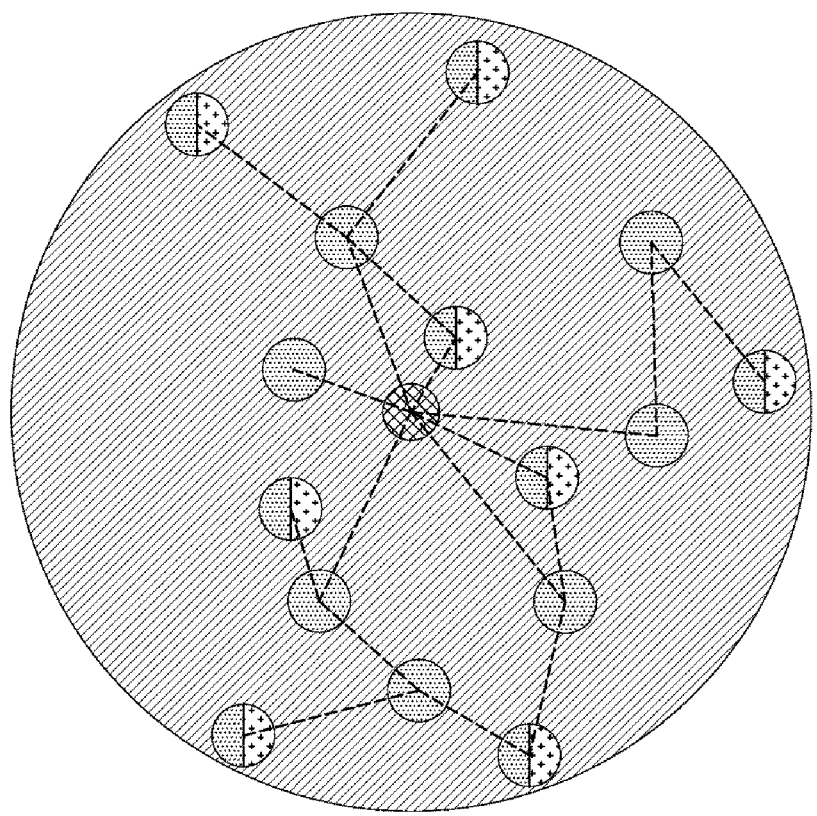

FIG. 9 shows step 66 in FIG. 6. Visual keyframes connected by strong correlation visual edges are disposed.

According to results of FIG. 8, the controller 250 removes weak correlation edges and also removes frame nodes in which LiDAR keyframes are only registered.

Next, the controller 250 as in FIG. 6 leaves only frame nodes including LiDAR keyframes, in the essential graph (S67), and uses the left nodes to generate a loop closing correlation (loop closing constraints or, otherwise, known as a closed loop correlation) between the nodes.

Figure 10:
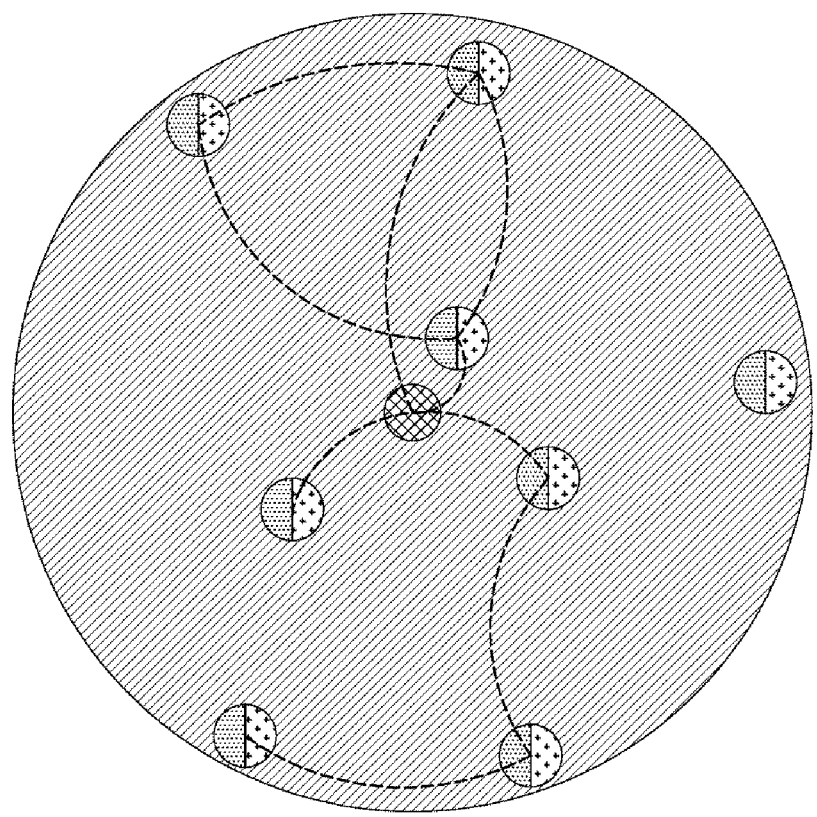

FIG. 10 shows step 67 in FIG. 6. The frame nodes including LiDAR keyframes are only left, and edges of the nodes are used to generate a loop closing correlation (loop closing constraints).

As an example of the loop closing correlation, the correlation may include displacement between two nodes. In this case, when the robot moves between two nodes, the controller 250 may confirm a position of the robot by comparing a value currently confirmed by the LiDAR sensor and the above-described displacement.

As described with reference to FIGS. 6 to 10, the controller 250 of the robot 1 generates a correlation between non-adjacent nodes.

That is, in nodes in which LiDAR information (LiDAR keyframes) and visual information (vision information, visual keyframes) are all registered, the controller 250 may verify the accuracy of information acquired by the camera sensor 230 using the LiDAR sensor 220 and may modify the information.

The controller 250 may select a node subject to matching using the LiDAR sensor among the keyframes or frames acquired by the camera sensor 230.

Additionally, the controller 250 may calculate a correlation between non-adjacent nodes of information sensed by the LiDAR sensor 220 using the visual essential graph for calculating a correlation between non-adjacent nodes.

The process in FIG. 6 may be performed as the following algorithm. In response to step 64 of FIG. 6, the controller 250 extracts all visual edges (edges between nodes in which visual keyframes are registered) within a maximum LiDAR sensing range around the reference node (Ref 2 to 4 lines of algorithm). The extracted edges are included in candidate visual edges ($E_{candidate}$).

Next, the controller 250 generates a visual essential graph using the candidate visual edges in response to line 7 (step 65, and step 66 in FIG. 6) of algorithm.

Then the controller 250 extracts a LiDAR loop correlation on the basis of nodes including LiDAR keyframes, a distance between the nodes, and whether there are LiDAR edges between the nodes in response to lines 10 and 11 (step 67 in FIG. 6) of algorithm.

Topological_dist(vi, vj) function of line 11 denotes the number of edges included in the shortest path between two nodes (vi, and vj).

Input    Reference node: $v_{ref}^v$
         Maximum sensing range of a LiDAR: $R_{max}^l$
         A set of frame nodes: $V = V^{vision} \cup V^{LiDAR}$
         All visual edges: $\{e_i^{vision} \in E^{vision} | i = 1, 2, 3 \ldots N_{edge}^{vision}\}$
Output A set of candidate loop constraints to be matched for LiDAR loop closing: $E_{required}$ 1    Initialize set: $E_{candidate} \leftarrow \emptyset, E_{required} \leftarrow \emptyset$
2    for i = 1 to $\mathcal{N}_{edge}^{vision}$
3      if $(\|p(v_{ref}^v) - p(v_{e_i vision}^1)\|_2 < R_{max}^l$ and
       $\|p(v_{ref}^v) - p(v_{e_i vision}^2)\|_2 < R_{max}^l)$
4        $E_{candidate} \leftarrow E_{candidate} \cup \{e_i^{vision}\}$
5      end if
6    end for
7    $G_{essential} \leftarrow$ Generate_visual_essential_graph($v_{ref}^v, E_{candidate}$)
8    for i = 1 to $\mathcal{N}_{vertices}(G_{essential})$
9      for j = 1 to $\mathcal{N}_{vertices}(G_{essential})$
10       if (i ≠ j and $v_i, v_j \in V^{LiDAR}$ and
11        $e_{(i,j)}^{LiDAR} \notin E^{LiDAR}$ and Topological_dist($v_i, v_j$) ≤ $T_{topo\_dist}$)
12         $E_{required} \leftarrow E_{required} \cup \{v_i, v_j\}$
13       end if

| | |
|---|---|
| 14 | end for |
| 15 | end for |

According to steps in FIGS. 6 to 10, the controller 250 may re-define a weak or wrong visual loop correlation (visual loop constraints), which is previously generated, using a LiDAR correlation. That is, errors in a visual loop correlation may be compensated using the LiDAR loop correlation. Additionally, sensing of the LiDAR sensor 220 is more precise than that of the camera sensor 230. Accordingly, precision of the entire map may be enhanced.

When the above-described embodiments are applied, the controller 250 calculates a correlation between nodes, in which keyframes are registered, on a map in which different types of data (LiDAR keyframes and visual keyframes) generated by different types of sensors are registered, thereby enhancing accuracy of fusion SLAM while the robot moves between the nodes.

That is, the robot 1 in fusion SLAM may calculate a correlation (constraints or edges) between nodes more accurately than a robot that performs SLAM ((LiDAR-only SLAM or visual-only SLAM) using a single sensor because errors of any one sensor may be compensated by other sensor.

The controller 250 as illustrated in FIG. 5 may calculate a correlation between adjacent nodes by combining odometry information for each sensor.

Additionally, the controller 250 as illustrated in FIGS. 6 to 10 may generate an essential graph on the basis of pieces of vision information (visual keyframes and the like), and on the basis of the essential graph, may calculate a correlation between non-adjacent nodes.

As a result, the robot 1 according to embodiments of the present disclosure may perform fusion SLAM using all the information generated by the LiDAR sensor 220 and the camera sensor 230, thereby enhancing accuracy at the time when the robot moves. Additionally, the robot 1 may generate a correlation between adjacent/non-adjacent nodes, and may use the correlation during performing fusion SLAM, thereby enhancing accuracy of the process of fusion SLAM.

Below, the processes in which the robot moves using a map that stores a correlation of nodes and in which the current position of the robot is calculated are described. That is, the controller 250 calculates the current position of the robot by comparing correlations of wheel odometry information, LiDAR frames sensed by the LiDAR sensor, visual frames sensed by the camera sensor, and nodes stored in the map storage 210.

Figure 11:
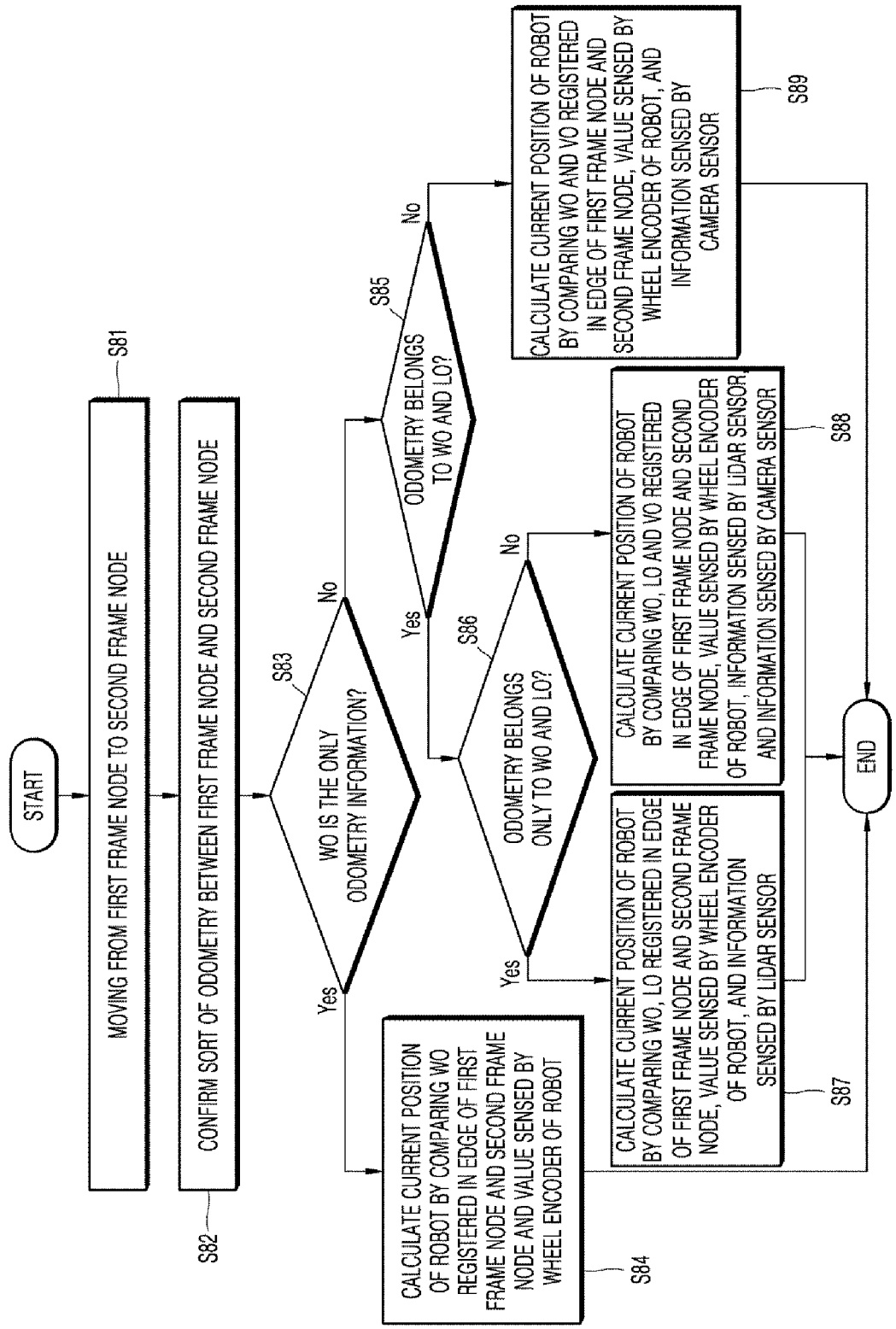
FIG. 11 shows a process of performing fusion SLAM according to an embodiment.

FIG. 11 shows a process of performing fusion SLAM according to an embodiment. FIG. 11 is an embodiment in which odometry information between adjacent nodes is used. The robot 1 is moving from a first frame node to a second frame node (S81). In this process, the controller 250 confirms the sort of odometry information between the first frame node and the second frame node (S81).

When wheel odometry (WO) is the only odometry information as a result of confirmation (S83), the controller 250 calculates the current position of the robot by comparing WO registered in edges of the first frame node and the second frame node, and values sensed by the wheel encoder 260 of the robot (S84).

For example, the wheel encoder 260 calculates a distance moved by the robot while the robot is moving from the first frame node. The controller 250 may calculate the current position of the robot 1 on the basis of WO (wheel odometry information) between the first frame node and the second frame node with respect to the first frame node and the second frame node.

When there is odometry information in addition to WO in step 83, step 85 is performed. When odometry information registered in the edges of the first frame node and the second frame node belongs to WO and LO, step 86 is performed.

When odometry information registered in the edges of the first frame node and the second frame node belongs only to WO and LO (S86), step 87 is performed. Additionally, the controller 250 calculates the current position of the robot by comparing WO and LO registered in the edges of the first frame node and the second frame node, and values (wheel odometry information) sensed by the wheel encoder of the robot, and information (LiDAR frames) sensed by the LiDAR sensor (S87).

When odometry information registered in the edges belongs to WO and LO and VO in step 86, step 88 is performed. The controller 250 calculates the current position of the robot by comparing WO, LO and VO registered in the edges of the first frame node and the second frame node, and values (wheel odometry information) sensed by the wheel encoder of the robot, information (LiDAR frames) sensed by the LiDAR sensor, and information (visual frames) sensed by the camera sensor 230 (S88).

In step 88, a single frame may be first applied to calculation of the position of the robot according to the size of data of the LiDAR frames and the size of data of the visual frames. For example, in the case in which a small amount of time is spent on comparing LiDAR frames, WO and LO are first used to calculate the position of the robot 1. The controller 250 calculates the current position of the robot by first combining the wheel odometry information and the LiDAR odometry information rather than the visual odometry information.

Additionally, to enhance accuracy of calculation of the position, the controller 250 may re-calculate the position of the robot 1 using VO. When a two-dimensional LiDAR sensor generates LiDAR frames, the size of data is small. Accordingly, LiDAR frames and LiDAR odometry information may be first applied.

Conversely, in the case in which a small amount of time is spent on comparing visual frames, WO and VO are first used to calculate the position of the robot 1. Additionally, to enhance accuracy of calculation of the position, the controller 250 may re-calculate the position of the robot 1 using LO. When a three-dimensional LiDAR sensor generates LiDAR frames, the size of data is large. Accordingly, visual frames and visual odometry information may be first applied.

When odometry information, registered in the edges in step 85, does not belong to WO and LO, the odometry information belongs to WO and VO. Accordingly, step 89 may be performed. Additionally, the controller 250 calculates the current position of the robot by comparing WO and VO registered in the edges of the first frame node and the second frame node, and values (wheel odometry information) sensed by the wheel encoder of the robot, and information (visual frames) sensed by the camera sensor (S89).

The process in FIG. 11 is briefly described as follows. The LiDAR sensor 220 senses a distance between an object outside the robot and the robot to generate a first LiDAR frame while the robot is moving. The camera sensor 230 photographs an object outside the robot to generate a first visual frame while the robot is moving. Additionally, the controller 250 extracts a correlation between nodes of a pose graph from the map storage 210.

As a result, the controller 250 calculates the current position of the robot by comparing the first LiDAR frame or the first visual frame, which is generated in the current position of the robot, or wheel odometry information in the current position and an extracted correlation (odometry information, WO, LO, and VO) between nodes while the robot is moving from the first frame node to the second frame node.

That is, when there is any one of LiDAR odometry information or visual odometry information, which is registered between adjacent nodes, the controller 250 may calculate the current position of the robot by combining wheel odometry information and any one of the LiDAR odometry information or visual odometry information.

The controller 250 calculates the current position of the robot by comparing wheel odometry information (WO) and a distance moved by the robot and sensed by the wheel encoder, and by comparing LiDAR odometry information (LO) or visual odometry information (VO) and LiDAR/visual frames sensed by the robot.

Figure 12:
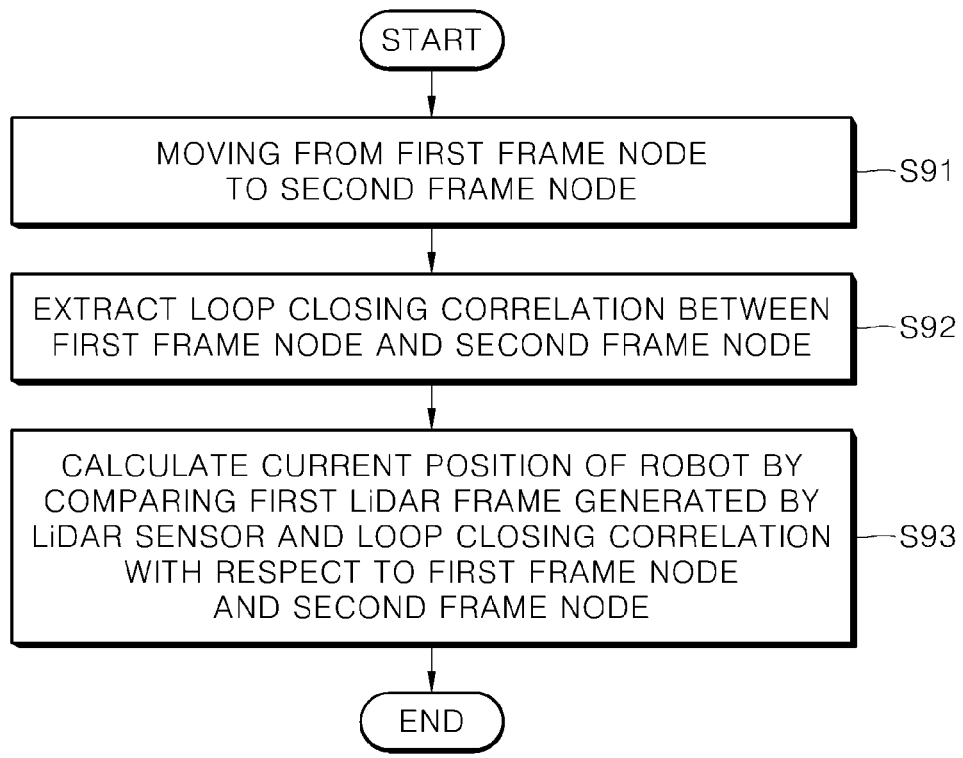
FIG. 12 shows a process of performing fusion SLAM according to an embodiment.

FIG. 12 shows a process of performing fusion SLAM according to an embodiment. FIG. 12 is an embodiment in which odometry information between non-adjacent nodes is used.

The robot 1 is moving from a first frame node to a second frame node (S91). The first frame node and the second frame node are non-adjacent nodes. Additionally, suppose that a LiDAR loop closing correlation is registered between the first frame node and the second frame node.

The controller 250 extracts a loop closing correlation between the first frame node and the second frame node (S92). Additionally, the controller 250 calculates the current position of the robot with respect to the first frame node and the second frame node by comparing a first LiDAR frame generated by the LiDAR sensor and the loop closing correlation (S93).

Although in embodiments, all the elements that constitute the embodiments of the present disclosure are described as being coupled to one or as being coupled to one so as to operate, the disclosure is not limited to the embodiments. One or more of all the elements may be optionally coupled to operate within the scope of the present disclosure. Additionally, each of the elements may be implemented as single independent hardware, or some or all of the elements may be optionally combined and implemented as a computer program that includes a program module for performing some or all of the combined functions in single hardware or a plurality of hardware. Codes or segments that constitute the computer program may be readily inferred by one having ordinary skill in the art. The computer program is recorded on computer-readable media and read and executed by a computer to implement the embodiments. Storage media that store computer programs includes storage media magnetic recording media, optical recording media, and semiconductor recording devices. Additionally, the computer program that embodies the embodiments includes a program module that is transmitted in real time through an external device.

The embodiments of the present disclosure have been described. However, the embodiments may be changed and modified in different forms by one having ordinary skill in the art. Thus, it should be understood that the changes and modifications are also included within the scope of the present disclosure.

The invention claimed is:

1. A robot, the robot comprising:
a wheel encoder configured to generate wheel odometry information while the robot is moving;
a light detection and ranging (LiDAR) sensor configured to sense a distance between an object outside of the robot and the robot and to generate a LiDAR frame;
a camera sensor configured to capture an image of the object outside of the robot and to generate a visual frame;
a controller configured to generate:
a first graph comprising: (A) a LiDAR branch including one or more LiDAR frames, (B) a visual branch including one or more visual frames, and (C) a backbone corresponding to information on a trajectory of the robot and including two or more frame nodes that correspond to the trajectory and are each associated with at least a LiDAR frame from among the one or more LiDAR frames or a visual frame from among the one or more visual frames; and
a correlation between the two or more frame nodes in the first graph; and
a map storage configured to store the LiDAR branch, the visual branch, the backbone, and the correlation,
wherein the controller is further configured to search a set of nodes that are connected in a constraint relation between visual frames around a reference node within a maximum sensing distance that may be sensed by the LiDAR sensor, generate a covisibility graph based on the searched set of nodes, generate an essential graph using a comparison between two visual frames which are respectively registered in two nodes in the set, and compensate for errors in a visual loop correlation using a LiDAR loop correlation using the essential graph, and
wherein the controller is further configured to, while the robot moves from a first frame node to a second frame node, the first frame node and the second frame node being non-adjacent nodes, extract a loop correlation between the first frame node and the second frame node, and calculate a current position of the robot with respect to the first frame node and the second frame node by comparing the LiDAR frame generated by the LiDAR sensor and the extracted loop correlation.

2. The robot of claim 1, wherein the controller is further configured to:
select two adjacent frame nodes from among the two or more frame nodes;
set wheel odometry information as the correlation between the two adjacent frame nodes, wherein the wheel odometry information is generated by the wheel encoder while the robot moves between a first location correlated with a first adjacent frame node from among the two adjacent frame nodes to a second location correlated with a second adjacent frame node from among the two adjacent frame nodes; and
store the correlation in the map storage.

3. The robot of claim 2, wherein the two adjacent frame nodes are each respectively associated with a first LiDAR frame from among the one or more LiDAR frames and a second LiDAR frame from among the one or more LiDAR frames, wherein the controller is configured to generate LiDAR odometry information using two LiDAR frames located between the first LiDAR frame and the second LiDAR frame.

4. The robot of claim 2, wherein the two adjacent frame nodes are each respectively associated with a first visual frame from among the one or more visual frames and a second visual frame from among the one or more visual frames, wherein the controller is configured to generate visual odometry information using two visual frames located between the first visual frame and the second visual frame.

5. The robot of claim 1, wherein the controller is further configured to:
   select two non-adjacent frame nodes from among the two or more frame nodes, wherein the two non-adjacent frame nodes are each respectively associated with two visual frames from among the one or more visual frames and indicate two nodes in which wheel odometry information is not registered or two nodes that include two or more pieces of wheel odometry information;
   generate a second graph; and
   generate a correlation between frame nodes that are associated with LiDAR frames from among the one or more LiDAR frames in the generated second graph.

6. The robot of claim 5, wherein the correlation generated between the frame nodes is based at least in part on a similarity between a first visual frame of a first frame node and a second visual frame of a second frame node in the second graph.

7. A robot, the robot comprising:
   a wheel encoder configured to generate wheel odometry information while the robot is moving;
   a LiDAR sensor configured to sense a distance between an object outside of the robot and the robot and to generate a first LiDAR frame;
   a camera sensor configured to capture an image of the object outside of the robot and to generate a first visual frame;
   a map storage configured to store: (A) a LiDAR branch including a plurality of LiDAR frames comparable with the first LiDAR frame, (B) a visual branch including a plurality of visual frames comparable with the first visual frame, (C) a first graph comprising a backbone corresponding to information on a trajectory of the robot and including two or more frame nodes that correspond to the trajectory and are each associated with at least one of the stored LiDAR frame or the stored visual frame, and (D) a correlation between frame nodes in the first graph; and
   a controller configured to determine, while the robot moves from a first location correlated with a first frame node to a second location correlated with a second frame node, a current location of the robot using: wheel odometry information associated with the current location, the first LiDAR frame or the first visual frame generated in the current location of the robot, wherein the controller is further configured to search a set of nodes that are connected in a constraint relation between visual frames around a reference node within a maximum sensing distance that may be sensed by the LiDAR sensor, generate a covisibility graph based on the searched set of nodes, generate an essential graph using a comparison between two visual frames which are respectively registered in two nodes in the set, and compensate for errors in a visual loop correlation using a LiDAR loop correlation using the essential graph, and
   wherein the controller is further configured to, while the robot moves from the first frame node to the second frame node, the first frame node and the second frame node being non-adjacent nodes, extract a loop correlation between the first frame node and the second frame node, and calculate the current location of the robot with respect to the first frame node and the second frame node by comparing the first LiDAR frame generated by the LiDAR sensor and the extracted loop correlation.

8. The robot of claim 7, wherein a first and second frame node are each respectively associated with a first LiDAR frame from among the one or more LiDAR frames or a first visual frame from among the one or more visual frames and a second LiDAR frame from among the one or more LiDAR frames or a second visual frame from among the one or more visual frames, wherein the controller is further configured to determine the current location of the robot using: (A) the wheel odometry information and (B) at least one of LiDAR odometry information associated with LiDAR frames located between the first LiDAR frame correlated to the first frame node and the second LiDAR frame correlated to the second frame node or visual odometry information associated with visual frames located between the first frame node from among the two frame nodes and the second visual frame correlated to the second frame node based on the first frame node and the second frame node being adjacent frame nodes.

9. The robot of claim 8, wherein the controller is further configured to determine the current location of the robot by combining the wheel odometry information and the LiDAR odometry information based on the LiDAR odometry information and the visual odometry information being associated with LiDAR frames and visual frames located between the first frame node and the second frame node.

10. The robot of claim 7, wherein the controller is further configured to determine the current location of the robot with respect to the first frame node and the second frame node by comparing the first LiDAR frame and a LiDAR closed loop correlation based on: (A) the first frame node and the second frame node being non-adjacent frame nodes and (B) the LiDAR closed loop correlation being associated with frame nodes located between the first frame node and the second frame node.

11. A method, the method comprising:
   generating wheel odometry information by a wheel encoder of a robot while the robot is moving;
   sensing a distance between an object outside of the robot and the robot and generating a LiDAR frame by a LiDAR sensor of the robot;
   capturing an image of the object outside of the robot and generating a visual frame by a camera sensor of the robot;
   generating:
   a first graph comprising: (A) a LiDAR branch including one or more LiDAR frames, (B) a visual branch including one or more visual frames, and (C) a backbone corresponding to information on a trajectory of the robot and including two or more frame nodes that correspond to the trajectory and are each associated with at least a LiDAR frame from among the one or more LiDAR frames or a visual frame from among the one or more visual frames and
   a correlation between the two or more frame nodes in the first graph by a controller of the robot;
   storing the LiDAR branch, the visual branch, the backbone, and the correlation in a map storage by the controller;
   searching a set of nodes that are connected in a constraint relation between visual frames around a reference node within a maximum sensing distance that may be sensed by the LiDAR sensor;
   generating a covisibility graph based on the searched set of nodes;

generating an essential graph using a comparison between two visual frames which are respectively registered in two nodes in the set;

compensating for errors in a visual loop correlation using a LiDAR loop correlation using the essential graph; and while the robot moves from a first frame node to a second frame node, the first frame node and the second frame node being non-adjacent nodes:

extracting a loop correlation between the first frame node and the second frame node; and calculating a current position of the robot with respect to the first frame node and the second frame node by comparing the LiDAR frame generated by the LiDAR sensor and the extracted loop correlation.

12. The method of claim 11, further comprising:

selecting two adjacent frame nodes from among the two or more frame nodes by the controller;

setting wheel odometry information as the correlation between the two adjacent frame nodes, wherein the wheel odometry information is generated by the wheel encoder while the robot moves from a first location correlated with a first adjacent frame node from among the two adjacent frame nodes to a second location correlated with a second adjacent frame node from among the two adjacent frame nodes; and storing the correlation in the map storage by the controller.

13. The method of claim 12, wherein the two adjacent frame nodes are each respectively associated with a first LiDAR frame from among the one or more LiDAR frames and a second LiDAR frame from among the one or more LiDAR frames, wherein the method further comprising generating LiDAR odometry information using two LiDAR frames located between the first LiDAR frame and the second LiDAR frame by the controller.

14. The method of claim 12, wherein the two adjacent frame nodes are each respectively associated with a first visual frame from among the one or more visual frames and a second visual frame from among the one or more visual frames, wherein the method further comprising generating visual odometry information using two visual frames between the first visual frame and the second visual frame by the controller.

15. The method of claim 11, further comprising:

selecting two non-adjacent frame nodes from among the two or more frame nodes, wherein the two non-adjacent frame nodes are each respectively associated with two visual frames from among the one or more visual frames and indicate two nodes in which wheel odometry information is not registered or two nodes that include two or more pieces of wheel odometry;

generating a second graph by the controller; and generating a correlation between frame nodes that are associated with LiDAR frames from among the one or more LiDAR frames in the generated second graph by the controller.

16. The method of claim 15, wherein the correlation generated between the frame nodes is based at least in part on a similarity between a first visual frame of a first node and a second visual frame of a second node in the second graph.

17. The method of claim 11, further comprising:

sensing a distance between an object outside of the robot and the robot and generating a first LiDAR frame by a LiDAR sensor;

capturing an image of the object outside of the robot and generating a first visual frame by a camera sensor; and determining, while the robot moves from a first location correlated with a first frame node to a second location correlated with a second frame node by a controller, a current location of the robot using: wheel odometry information associated with the current location, the first LiDAR frame or the first visual frame generated in the current location of the robot.

18. The method of claim 17, wherein a first and second frame node are each respectively associated with a first LiDAR frame from among the one or more LiDAR frames or a first visual frame from among the one or more visual frames and a second LiDAR frame from among the one or more LiDAR frames or a second visual frame from among the one or more visual frames, further comprising determining the current location of the robot using: (A) the wheel odometry information and (B) at least one of LiDAR odometry information associated with LiDAR frames located between the first LiDAR frame correlated to the first frame node and the second LiDAR frame correlated to the second frame node or visual odometry information associated with visual frames located between the visual frame correlated to the first frame node and the second visual frame correlated to the second frame node based on the first frame node and the second frame node being adjacent frame nodes.

19. The method of claim 18, further comprising determining the current location of the robot by combining the wheel odometry information and the LiDAR odometry information by the controller based on the LiDAR odometry information and the visual odometry information being associated with LiDAR frames and visual frames located between the first frame node and the second frame node.

20. The method of claim 17, further comprising determining the current location of the robot with respect to the first frame node and the second frame node by comparing the first LiDAR frame and a LiDAR closed loop correlation by the controller based on: (A) the first frame node and the second frame node being non-adjacent nodes and (B) the LiDAR closed loop correlation being associated with frame nodes located between the first frame node and the second frame node.

* * * * *